Feb. 5, 1957  R. F. McLEAN  2,780,076
AUTOMOBILE REFRIGERATING APPARATUS
Filed Jan. 14, 1953  4 Sheets-Sheet 1

INVENTOR.
Robert F. Mc Lean
BY *Willits, Hardman, Fehr*

Attorneys

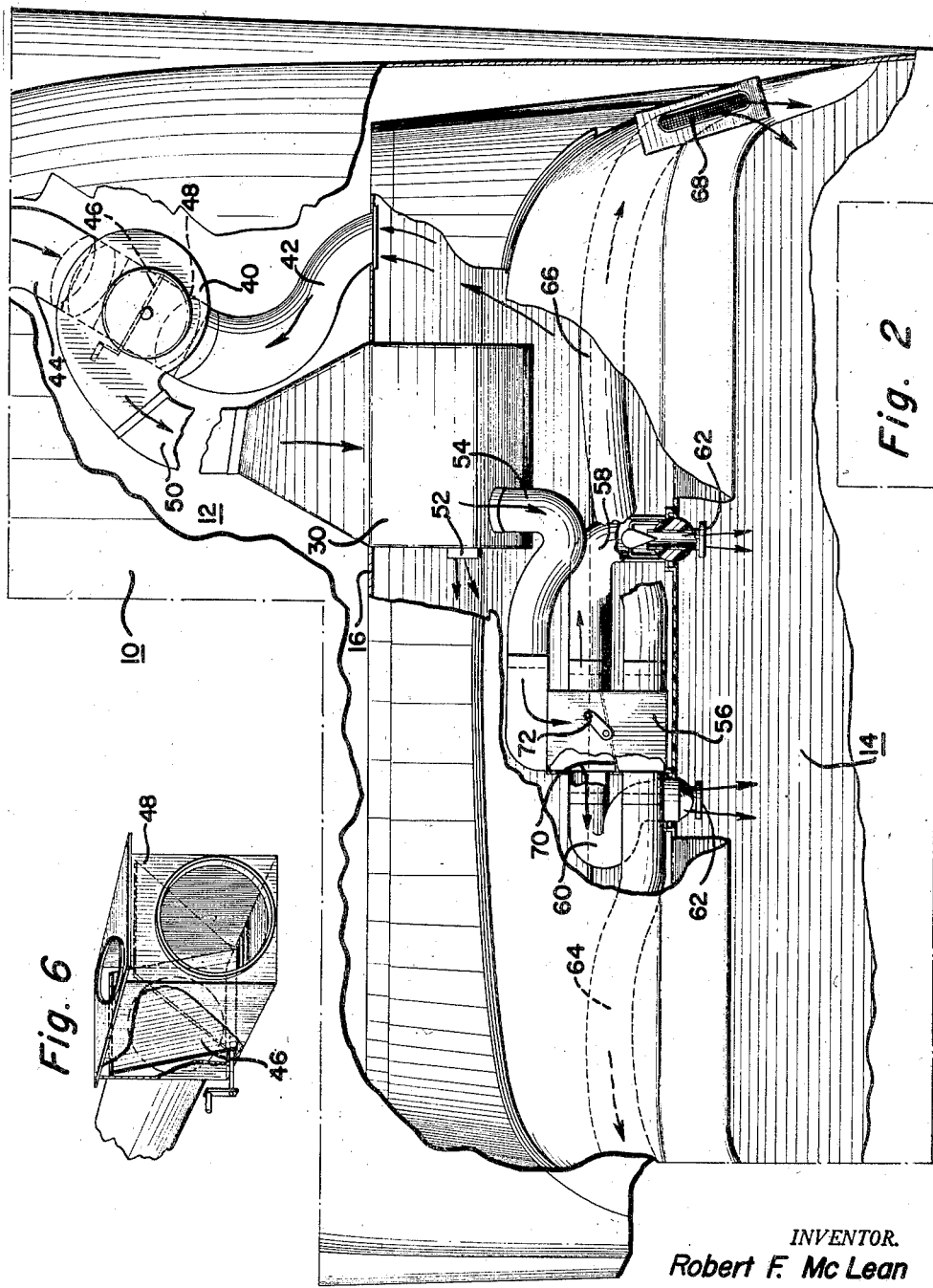

Feb. 5, 1957    R. F. McLEAN    2,780,076
AUTOMOBILE REFRIGERATING APPARATUS
Filed Jan. 14, 1953    4 Sheets-Sheet 3
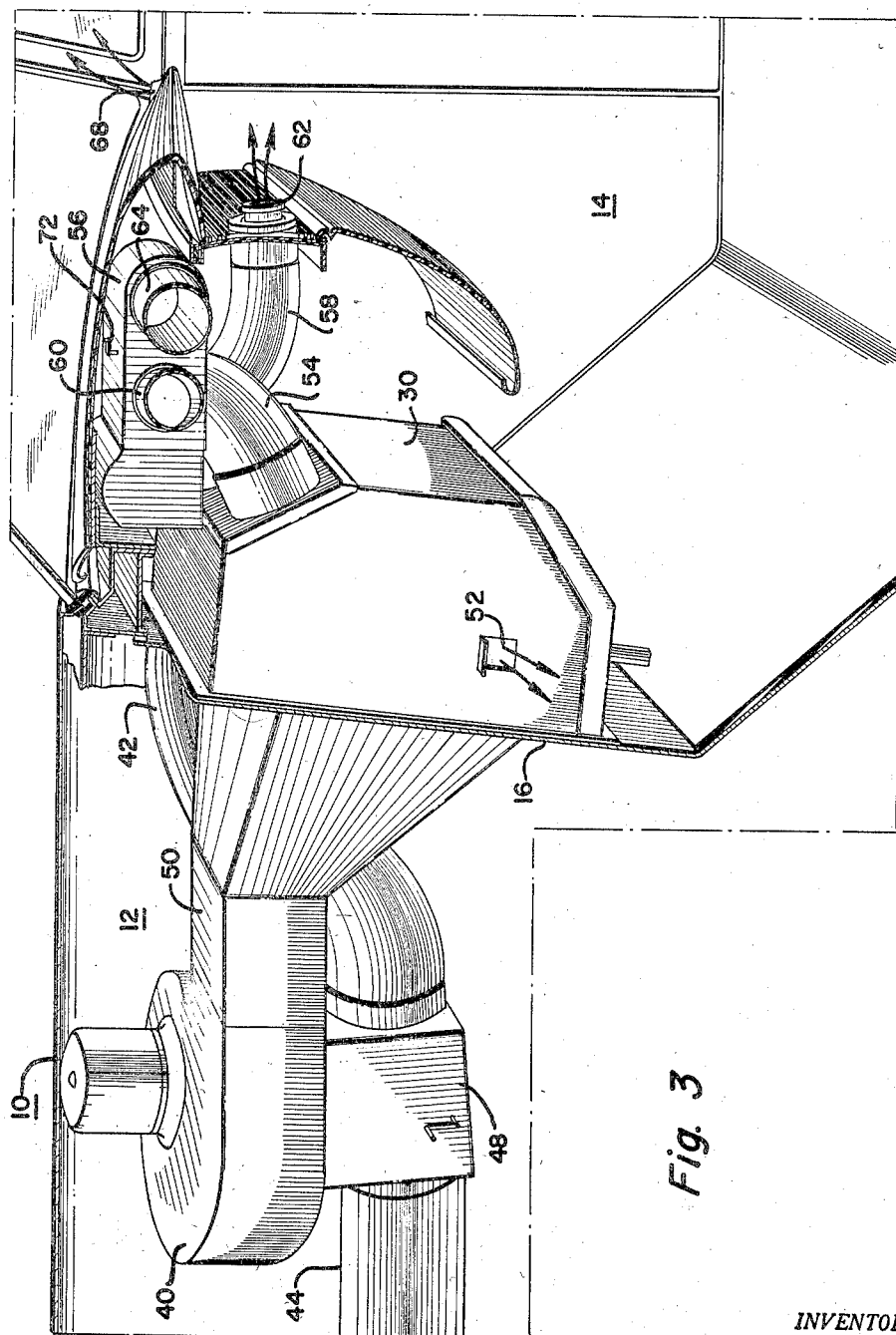
INVENTOR.
Robert F. Mc Lean
BY *Willits, Hardman & Fehr*
Attorneys INVENTOR.
Robert F. McLean

United States Patent Office 2,780,076
Patented Feb. 5, 1957

2,780,076
AUTOMOBILE REFRIGERATING APPARATUS

Robert F. McLean, Oak Park, Mich., assignor to General Motors Corporation, Detroit, Mich., a corporation of Delaware Application January 14, 1953, Serial No. 331,275

4 Claims. (Cl. 62—117.1)

This invention relates to refrigerating apparatus and more particularly to an automobile air conditioning system.

It is recognized that a large number of arrangements have been proposed from time to time for air conditioning automobiles, but these have been impractical either because of excessive cost, difficulty of installation, inability to produce comfort within the passenger compartment or for other reasons. It is an object of this invention to provide a practical and compact automobile air conditioning system which is easy to install without making any major changes in the car design.

Another object of this invention is to provide an air conditioning system which eliminates the need for long refrigerant lines.

Still another object of this invention is to provide an improved air distribution and control system which makes it possible to direct the conditioned air towards the faces of the passengers rather than towards their backs and necks.

Further objects and advantages of the present invention will be apparent from the following description, reference being had to the accompanying drawings, wherein a preferred form of the present invention is clearly shown.

In the drawings:

Figure 2 is a fragmentary plan view with parts broken away showing the manner in which the evaporator and air distributing ducts are mounted in the car;

Figure 3 is a fragmentary perspective view partly in section showing the location of the evaporator and air ducts within the car;

Figure 6 is a perspective view with parts broken away showing the fresh and return air inlet damper arrangements.

Figure 1:
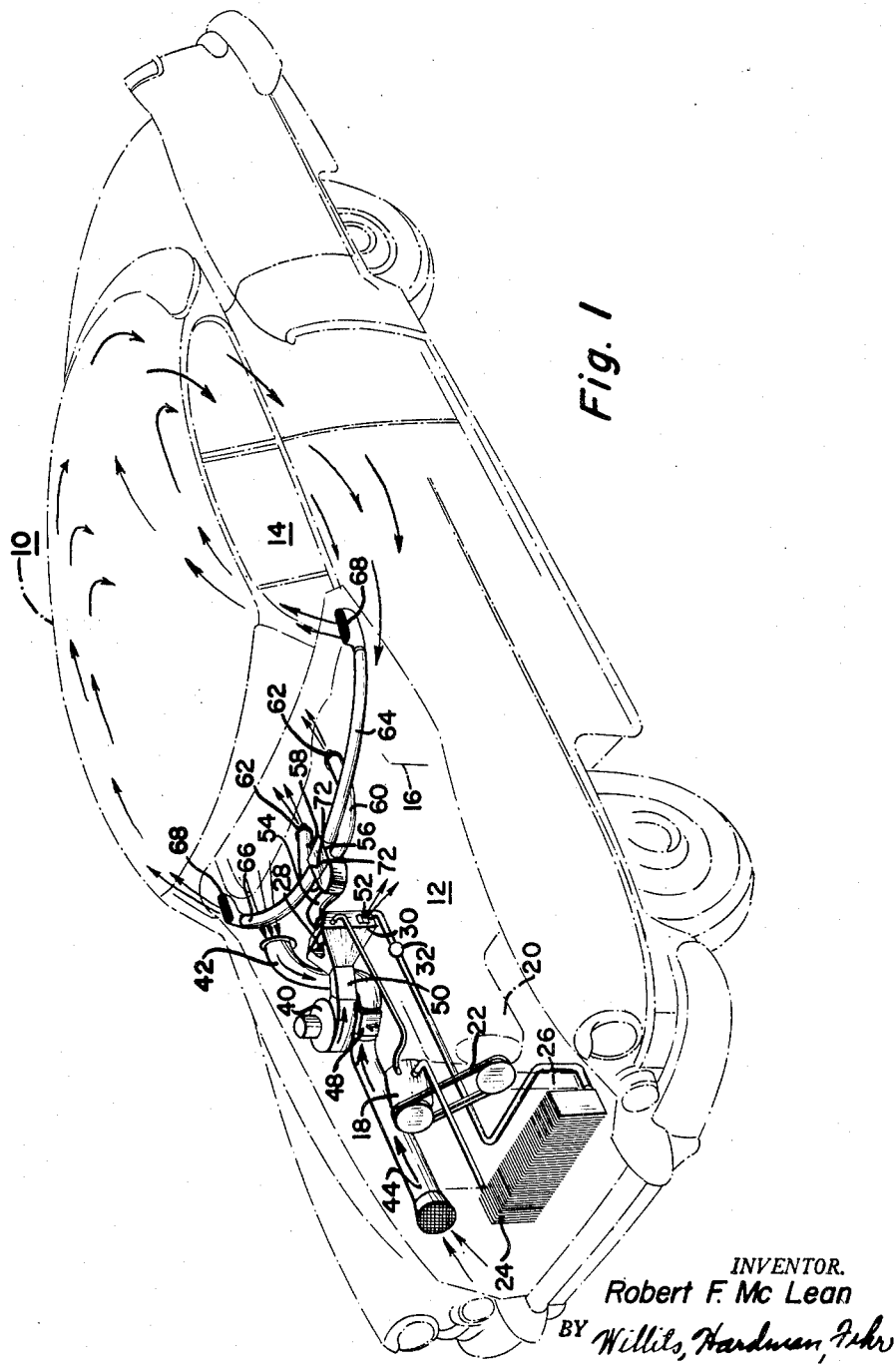
Figure 1 is a perspective view somewhat diagrammatic showing the invention applied to a conventional passenger automobile.
Figures 4, 5:
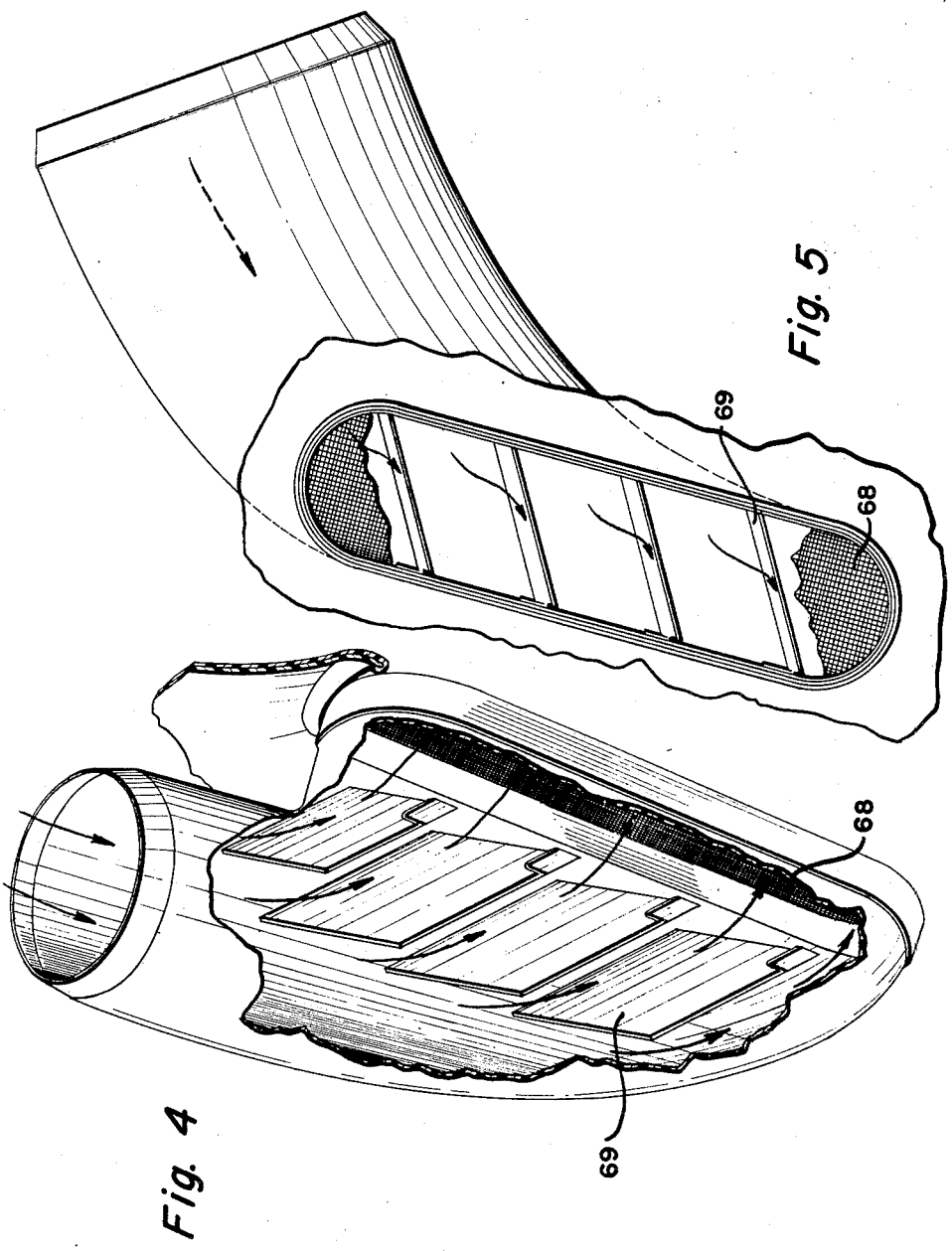
Figure 4 is a perspective view with parts broken away of one of the air outlet grills for directing air into the rear passenger compartment.
Figure 5 is a plan view of the grill shown in Figure 4.

Referring now to the drawing wherein a preferred embodiment of the invention has been shown, reference numeral 10 generally designates an automobile having an engine compartment 12 and a passenger compartment 14 separated from one another by means of a wall 16 commonly referred to as the dashboard. For purposes of illustrating the invention there is shown a conventional compression type of volatile refrigerant system which includes a sealed compressor 18 which is directly driven from the car engine 20 through a belt drive 22. The compressed refrigerant leaving the compressor 18 discharges into a condenser 24 located in front of the engine radiator 26. The liquefied refrigerant flows from the condenser into an evaporator 28 located in a housing 30 which is mounted on the dashboard 16 directly within the passenger compartment 14. This arrangement permits the use of short refrigerant lines which may be readily installed, tested for leaks or replaced.

The flow of refrigerant to the evaporator 28 is controlled by a conventional thermostatic expansion valve 32. In order to simplify this disclosure no additional controls have been shown whereas any conventional means could be provided for balancing the output of the refrigeration system with the air conditioning load.

The air to be conditioned is circulated by means of a blower 40 which is also located in the engine compartment of the car. The air to be conditioned may be selectively taken from either of two sources. Thus, a return air duct 42 is provided as shown for withdrawing air from the passenger compartment adjacent the lower right front corner of the passenger compartment. A fresh air intake duct 44 is provided as shown in Figure 1 for conveying fresh air from the front of the car into the inlet of the blower 40. The ratio of fresh air to recirculated air may be controlled by means of a damper 46 located in the damper housing 48 provided at the inlet side of the blower 40. If desired, the damper 46 may be arranged to be operated by means of a flexible wire (not shown) or the like from within the passenger compartment. The air leaves the blower 40 through a duct 50 which directs the air to be conditioned into the evaporator housing 30.

As best shown in Figure 1, the evaporator housing 30 is provided with a small air outlet 52 at its one side which directs a portion of the conditioned air directly towards the lower left corner of the passenger compartment so as to cool the region surrounding the driver's feet. The main portion of the cooled air, however, leaves the housing 30 through a duct 54 which leads to a plenum chamber 56 located within the passenger compartment. A first pair of outlet ducts 58 and 60 convey air from the plenum chamber 56 to adjustable air deflectors 62 located on the instrument panel as shown for directing controlled amounts of air in the direction of the driver and/or any other passenger or passengers in the front seat. These deflectors adjust both the direction of the air stream as well as the volume of air flowing therethrough.

For purposes of illustration there have been shown air deflectors of the general type shown in United States Patent 2,516,805 to which reference is hereby made for a more complete description of the air deflector per se. Air for cooling the passengers occupying the rear seat of the car leaves the plenum chamber 56 through ducts 64 and 66 which lead to a pair of fixed air outlet grills 68 located adjacent the front side corners of the passenger compartment as best shown in Figures 1 and 2. These grills include fixed louvers 69 as shown which serve to direct the air upwardly and toward the rear along the side walls so as to avoid the passengers in the front seat but supply conditioned air to the passengers in the back seat.

In order to make it possible for the driver to concentrate the air conditioning effect within the front portion of the passenger compartment, such as when there are no passengers occupying the rear seat, a damper 70 has been provided in the plenum chamber 56. This damper is so arranged that in the one position thereof all of the conditioned air is directed into the ducts 58 and 60 which primarily serve to distribute the conditioned air within the front portion of the passenger compartment.

In another extreme position of the damper 70 more than half of the conditioned air is directed into the ducts 64 and 66 for cooling the rear portion of the passenger compartment. It is obvious that it is possible to vary the ratio of air supplied to the respective portions of the passenger compartment by varying the setting of the dampers 70. A damper operator 72 is provided for enabling the damper 70 to be controlled from within the passenger compartment.

While the form of embodiment of the invention as herein disclosed constitutes a preferred form, it is to be understood that other forms might be adopted, as may come within the scope of the claims which follows.

What is claimed is as follows:

1. In combination with a passenger automobile having an engine compartment, a passenger compartment separated therefrom by a wall and having windows in the sides thereof, and an instrument panel at the front of said passenger compartment; a refrigerating system including an evaporator, a housing for said evaporator disposed in said passenger compartment and having air inlet and outlet openings, a blower within said engine compartment and having an outlet in communication with said evaporator housing inlet for forcing air to be conditioned through said housing so as to be cooled by said evaporator, means forming a plenum chamber connected with the outlet of said evaporator housing, first duct means for conveying air from said plenum chamber into the forward portion of said passenger compartment, second duct means for conveying air from said plenum chamber to the front corners of said passenger compartment, grill means at the outlets of said second duct means for directing the air flowing therethrough upwardly from said instrument panel adjacent said windows and towards the rear of said passenger compartment, and means in said plenum chamber for controlling the ratio of air flowing into said first and second duct means.

2. In combination with a passenger automobile having an engine compartment, a passenger compartment separated therefrom by a wall, and an instrument panel; a refrigerating system including an evaporator, a housing for said evaporator disposed in said passenger compartment and having air inlet and outlet openings, a blower within said engine compartment and having an outlet in communication with said evaporator housing inlet for forcing air to be conditioned through said housing so as to be cooled by said evaporator, means forming a plenum chamber connected with the outlet of said evaporator housing, first duct means for conveying air from said plenum chamber into the forward portion of said passenger compartment, second duct means for conveying air from said plenum chamber to the front corners of said passenger compartment, grill means at the outlets of said second duct means for directing the air flowing therethrough towards the rear of said passenger compartment, means in said plenum chamber for controlling the ratio of air flowing into said first and second duct means, and air deflector means at the outlet of said first duct means for controlling the direction and volume of air leaving said first duct means.

3. In combination with a passenger automobile having a wall separating the engine compartment from the passenger compartment, a refrigerating system including an evaporator, a housing for said evaporator having air inlet and outlet openings, a blower having an outlet connected with said evaporator housing inlet for forcing air to be conditioned through said housing so as to be cooled by said evaporator, means forming a plenum chamber connected with the outlet of said evaporator housing, first duct means for conveying air from said plenum chamber into the forward portion of said passenger compartment, second duct means for conveying air from said plenum chamber including means for directing the air flowing therethrough towards the rear of said passenger compartment, damper means in said plenum chamber for controlling the ratio of air flowing into said first and second duct means, and means within said passenger compartment for manually controlling said damper means.

4. In combination, a vehicle having a passenger compartment provided with front and rear seats, panel means adjacent the front of said vehicle, refrigerating apparatus including an air cooling coil for cooling said passenger compartment, means for circulating air to be conditioned in thermal exchange relationship with said coil, duct means in communication with said air circulating means having a plurality of air outlets for distributing said air within said passenger compartment, air deflector means for a first pair of said outlets mounted on said panel means and having adjustable deflectors for directing air at various angles relative to occupants of said front seat, a second pair of said outlets having fixed grill means supported on said panel means for directing air along opposite sides of occupants of said front seat for cooling the passengers in the back seat, and another of said outlets directing a stream of air downwardly towards the floor of said passenger compartment.

References Cited in the file of this patent

UNITED STATES PATENTS

| | | |
|---|---|---|
| 2,181,851 | Schlumbohm | Nov. 28, 1939 |
| 2,304,643 | Hans | Dec. 8, 1942 |
| 2,306,796 | Staley et al. | Dec. 29, 1942 |
| 2,518,356 | Mieras et al. | Aug. 8, 1950 |
| 2,523,923 | Rodert | Sept. 26, 1950 |
| 2,612,829 | Joyce | Oct. 7, 1952 |